US012045006B2

(12) United States Patent
Iwasaki et al.

(10) Patent No.: US 12,045,006 B2
(45) Date of Patent: Jul. 23, 2024

(54) ELECTROPHOTOGRAPHIC PHOTOSENSITIVE MEMBER

(71) Applicant: CANON KABUSHIKI KAISHA, Tokyo (JP)

(72) Inventors: Shuhei Iwasaki, Kanagawa (JP); Tomohito Ishida, Shizuoka (JP); Nobuhiro Nakamura, Shizuoka (JP); Hiroyuki Watanabe, Shizuoka (JP); Tatsuya Yamaai, Kanagawa (JP); Yuka Ishiduka, Shizuoka (JP); Yota Ito, Tokyo (JP); Takeshi Murakami, Kanagawa (JP)

(73) Assignee: CANON KABU SHIKI KAISHA, Tokyo (JP)

( * ) Notice: Subject to any disclaimer, the term of this patent is extended or adjusted under 35 U.S.C. 154(b) by 694 days.

(21) Appl. No.: 17/230,550

(22) Filed: Apr. 14, 2021

(65) Prior Publication Data

US 2021/0325794 A1 Oct. 21, 2021

(30) Foreign Application Priority Data

Apr. 21, 2020 (JP) ................................ 2020-075644

(51) Int. Cl.
*G03G 5/147* (2006.01)
*G03G 5/047* (2006.01)
(Continued)

(52) U.S. Cl.
CPC ............. *G03G 5/047* (2013.01); *G03G 15/75* (2013.01); *G03G 21/1814* (2013.01)

(58) Field of Classification Search
CPC . G03G 5/147; G03G 5/14734; G03G 5/14752
See application file for complete search history.

(56) References Cited

U.S. PATENT DOCUMENTS 4,804,607 A 2/1989 Atsumi
4,908,329 A 3/1990 Kanai et al.
(Continued)

FOREIGN PATENT DOCUMENTS

EP 3 422 106 A1 1/2019
JP 63-91666 A 4/1988
(Continued)

OTHER PUBLICATIONS

U.S. Appl. No. 17/228,879, filed Apr. 13, 2021, Tomohito Ishida.
U.S. Appl. No. 17/229,475, filed Apr. 13, 2021, Nobuhiro Nakamura.

*Primary Examiner* — Peter L Vajda
(74) *Attorney, Agent, or Firm* — VENABLE LLP

(57) ABSTRACT

There is provided an electrophotographic photosensitive member having drum shape, the electrophotographic photosensitive member including a support and a photosensitive layer, wherein an outer surface of the electrophotographic photosensitive member has wrinkles, and when an observation region having square form with one side of 100 μm is placed at an arbitrary position on the outer surface, a line that passes through a central point of the observation region and is parallel to a circumferential direction of the electrophotographic photosensitive member is defined as a first reference line L1, and 3,599 reference lines obtained by rotating the first reference line L1 at every 0.1° around the central point are defined as L2 to L3,600, respectively, each of L1 to L3,600 intersects with convex portions of the wrinkles at a plurality of locations and has at least two different intersection angles selected from the plurality of locations.

5 Claims, 4 Drawing Sheets

(51) Int. Cl.
*G03G 15/00* (2006.01)
*G03G 21/18* (2006.01)

(56) References Cited

U.S. PATENT DOCUMENTS

| | | | |
|---|---|---|---|
| 4,908,330 | A | 3/1990 | Arai et al. |
| 5,162,183 | A | 11/1992 | Lindblad |
| 5,759,291 | A | 6/1998 | Ichinose et al. |
| 6,991,881 | B2 | 1/2006 | Ogaki et al. |
| 6,994,941 | B2 | 2/2006 | Tanaka et al. |
| 7,001,699 | B2 | 2/2006 | Tanaka et al. |
| 7,910,274 | B2 | 3/2011 | Tanaka et al. |
| 8,088,541 | B2 | 1/2012 | Tanaka et al. |
| 8,455,170 | B2 | 6/2013 | Nakamura et al. |
| 8,481,236 | B2 | 7/2013 | Tanaka et al. |
| 8,841,052 | B2 | 9/2014 | Watariguchi et al. |
| 8,865,381 | B2 | 10/2014 | Tanaka et al. |
| 8,974,991 | B2 | 3/2015 | Kawahara et al. |
| 9,029,054 | B2 | 5/2015 | Okuda et al. |
| 9,040,214 | B2 | 5/2015 | Fujii et al. |
| 9,046,797 | B2 | 6/2015 | Fujii et al. |
| 9,063,505 | B2 | 6/2015 | Sekiya et al. |
| 9,068,083 | B2 | 6/2015 | Tanaka et al. |
| 9,069,267 | B2 | 6/2015 | Kaku et al. |
| 9,256,145 | B2 | 2/2016 | Fujii et al. |
| 9,280,071 | B2 | 3/2016 | Maruyama et al. |
| 9,304,416 | B2 | 4/2016 | Noguchi et al. |
| 9,372,417 | B2 | 6/2016 | Fujii et al. |
| 9,372,418 | B2 | 6/2016 | Shida et al. |
| 9,372,419 | B2 | 6/2016 | Tsuji et al. |
| 9,405,206 | B2 | 8/2016 | Kawaguchi et al. |
| 9,436,107 | B2 | 9/2016 | Murakami et al. |
| 9,459,542 | B2 | 10/2016 | Tanaka et al. |
| 9,523,929 | B2 | 12/2016 | Nakamura et al. |
| 9,535,346 | B2 | 1/2017 | Sekiya et al. |
| 9,535,347 | B2 | 1/2017 | Watariguchi et al. |
| 9,599,915 | B2 | 3/2017 | Anezaki et al. |
| 9,599,917 | B2 | 3/2017 | Okuda et al. |
| 9,658,543 | B2 | 5/2017 | Murakami et al. |
| 9,684,277 | B2 | 6/2017 | Yamamoto et al. |
| 9,726,992 | B2 | 8/2017 | Sakuma et al. |
| 9,772,569 | B2 | 9/2017 | Tanaka et al. |
| 9,851,646 | B2 | 12/2017 | Tomono et al. |
| 10,018,928 | B2 | 7/2018 | Murakami et al. |
| 10,073,362 | B2 | 9/2018 | Fujii et al. |
| 10,095,137 | B2 | 10/2018 | Murakami et al. |
| 10,372,050 | B2 | 8/2019 | Nishi et al. |
| 10,416,581 | B2 | 9/2019 | Ito et al. |
| 10,452,021 | B2 | 10/2019 | Miura et al. |
| 10,539,892 | B2 | 1/2020 | Nishida et al. |
| 10,545,453 | B2 | 1/2020 | Iwasaki et al. |
| 10,558,132 | B2 | 2/2020 | Ishiduka et al. |
| 10,558,133 | B2 | 2/2020 | Nakamura et al. |
| 10,642,177 | B2 | 5/2020 | Nakamura et al. |
| 10,663,913 | B2 | 5/2020 | Yamaai et al. |
| 10,691,033 | B2 | 6/2020 | Nishida et al. |
| 10,747,130 | B2 | 8/2020 | Okuda et al. |
| 10,747,131 | B2 | 8/2020 | Watanabe et al. |
| 10,831,117 | B2 | 11/2020 | Sakakibara et al. |
| 10,831,118 | B2 | 11/2020 | Watanabe et al. |
| 10,838,315 | B2 | 11/2020 | Shimozawa et al. |
| 10,942,462 | B2 | 3/2021 | Ito et al. |
| 11,003,102 | B2 | 5/2021 | Ishiduka et al. |
| 2009/0238602 | A1 | 9/2009 | Iwasaki |
| 2011/0195354 | A1 | 8/2011 | Nukada |
| 2014/0004450 | A1 | 1/2014 | Tokimitsu et al. |
| 2015/0185630 | A1 | 7/2015 | Ito et al. |
| 2015/0185634 | A1 | 7/2015 | Sekiya et al. |
| 2017/0060008 | A1 | 3/2017 | Okuda et al. |
| 2017/0299971 | A1 | 10/2017 | Mori |
| 2019/0004442 | A1 | 1/2019 | Kaku |
| 2019/0094730 | A1 | 3/2019 | Kamisaki |
| 2019/0332022 | A1* | 10/2019 | Shimada ................ G03G 5/142 |
| 2019/0369517 | A1 | 12/2019 | Watanabe |
| 2020/0264526 | A1 | 8/2020 | Shimozawa et al. |
| 2020/0393771 | A1 | 12/2020 | Iwasaki et al. |
| 2020/0409278 | A1 | 12/2020 | Makisumi et al. |
| 2020/0409279 | A1 | 12/2020 | Sekiya et al. |
| 2020/0409280 | A1 | 12/2020 | Ishida et al. |
| 2020/0409281 | A1 | 12/2020 | Watariguchi et al. |
| 2021/0026260 | A1 | 1/2021 | Noguchi et al. |
| 2021/0026268 | A1 | 1/2021 | Murakami et al. |
| 2021/0116826 | A1 | 4/2021 | Nishida et al. |
| 2021/0116833 | A1 | 4/2021 | Ishiduka et al. |

FOREIGN PATENT DOCUMENTS

| | | | |
|---|---|---|---|
| JP | 4-243266 | A | 8/1992 |
| JP | 2002-23400 | A | 1/2002 |
| JP | 2006-11047 | A | 1/2006 |
| JP | 2009-229549 | A | 10/2009 |
| JP | 2010-66670 | A | 3/2010 |
| JP | 2014-178425 | A | 9/2014 |
| JP | 2017-191242 | A | 10/2017 |
| JP | 2018-72475 | A | 5/2018 |
| JP | 2019-12141 | A | 1/2019 |
| JP | 2019-211546 | A | 12/2019 |

* cited by examiner

ELECTROPHOTOGRAPHIC PHOTOSENSITIVE MEMBER

BACKGROUND OF THE INVENTION

Field of the Invention

The present invention relates to an electrophotographic photosensitive member having drum shape (hereinafter referred to as an electrophotographic photosensitive drum), and a process cartridge and an electrophotographic apparatus each including the electrophotographic photosensitive member.

Description of the Related Art

An electrophotographic photosensitive drum containing an organic photoconductive substance (charge generating substance) has been used as an electrophotographic photosensitive drum mounted in a process cartridge or an electrophotographic apparatus. Recently, an electrophotographic apparatus having a longer lifespan has been required. Accordingly, it is desired to provide an electrophotographic photosensitive drum having an improved abrasion resistance (mechanical durability).

In general, an electrophotographic photosensitive drum is used in an electrophotographic image forming process including a charging step, an exposure step, a developing step, a transfer step, and a cleaning step. Among these steps, the cleaning step is a step of removing a residual toner on an outer surface of the electrophotographic photosensitive drum after the transfer step, and the cleaning step is important for obtaining a clear image. As a method of removing the residual toner in the cleaning step, a method in which a rubber cleaning blade is brought into pressure-contact with the electrophotographic photosensitive drum to scrape off the toner is generally used.

However, in the above cleaning method, a large amount of abrasion may be applied to the electrophotographic photosensitive drum due to a large frictional force between the cleaning blade and the electrophotographic photosensitive drum. Further, in general, a surface layer of an organic electrophotographic photosensitive drum is often formed by a dip coating method, and a surface of the surface layer (that is, a circumferential surface of the electrophotographic photosensitive drum) formed by the dip coating method becomes very smooth. Therefore, a contact area between the cleaning blade and the circumferential surface of the electrophotographic photosensitive drum is increased, and a frictional resistance between the cleaning blade and the circumferential surface of the electrophotographic photosensitive drum is further increased. Thus, the above problem becomes more remarkable.

As a method for overcoming the above-described problem, a method has been proposed in which the outer surface of the electrophotographic photosensitive drum is formed in a concave and convex shape to reduce the contact area between the outer surface of the electrophotographic photosensitive drum and the cleaning blade, whereby the frictional force is reduced.

Japanese Patent Application Laid-Open No. 2014-178425 describes a technique for allowing a surface layer to contain metal oxide fine particles. Japanese Patent Application Laid-Open No. 2006-11047 describes a technique for providing a large number of linear scratches on an outer surface of a cylindrical electrophotographic photosensitive drum by a roughening treatment.

In Japanese Patent Application Laid-Open No. 2014-178425, the surface layer contains the metal oxide fine particles, such that an outer surface of an electrophotographic photosensitive drum is formed in a concave and convex shape and a contact area between the outer surface of the electrophotographic photosensitive drum and a cleaning blade is reduced, whereby a frictional force is reduced. Unevenness of the concave and convex shape may occur on the outer surface of the electrophotographic photosensitive drum due to aggregation of the fine particles on the surface layer containing the fine particles. When the unevenness of the concave and convex shape occurs on the outer surface of the electrophotographic photosensitive drum, a toner partially slips through a contact portion between the cleaning blade and the electrophotographic photosensitive drum, resulting in a cleaning failure. Therefore, the method of reducing the frictional force between the electrophotographic photosensitive drum and the cleaning blade is required to be further improved.

In Japanese Patent Application Laid-Open No. 2006-11047, the outer surface of the electrophotographic photosensitive drum is roughened and predetermined linear scratches are formed thereon, such that a contact area when a cleaning blade abuts against the outer surface of the electrophotographic photosensitive drum is reduced, resulting in a reduction in frictional force. However, in a case where an abutting pressure of the cleaning blade against the electrophotographic photosensitive drum is low, a residual toner may slip through an abutting portion between the cleaning blade and the outer surface of the electrophotographic photosensitive drum having the linear scratches described in Japanese Patent Application Laid-Open No. 2006-11047, resulting in streaky image detects. Therefore, even in a case where the abutting pressure of the cleaning blade is low, improvements are required to exhibit high cleanability.

SUMMARY OF THE INVENTION

An object of the present invention is to provide an electrophotographic photosensitive drum capable of reducing a frictional force with a cleaning blade and further exhibiting high cleanability even in a case where an abutting pressure of the cleaning blade is low.

The above object is achieved by the present invention described below. According to the present invention, an electrophotographic photosensitive drum includes a support and a photosensitive layer, wherein an outer surface of the electrophotographic photosensitive drum has wrinkles, and when an observation region having square form with one side of 100 μm is placed at an arbitrary position on the outer surface, a line that passes through a central point of the observation region and is parallel to a circumferential direction of the electrophotographic photosensitive drum is defined as a first reference line L1, and 3,599 reference lines obtained by rotating the first reference line L1 at every 0.1° around the central point are defined as L2 to L3,600, respectively, each of L1 to L3,600 intersects with convex portions of the wrinkles at a plurality of locations and has at least two different intersection angles selected from the plurality of locations.

Further features of the present invention will become apparent from the following description of exemplary embodiments with reference to the attached drawings.

DESCRIPTION OF THE EMBODIMENTS

Figure 1A:
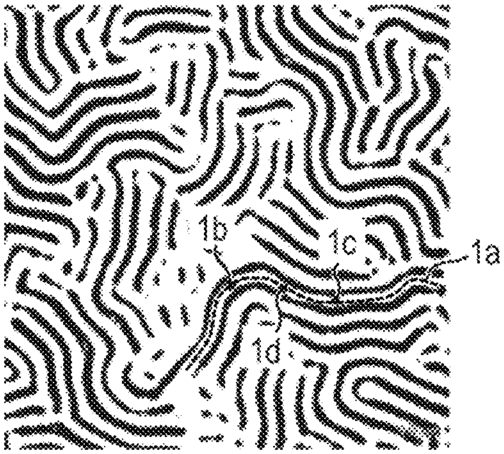
FIG. 1A is a top view illustrating an example of a concave and convex shape of a wrinkle formed on an outer surface of an electrophotographic photosensitive drum according to the present invention.

Preferred embodiments of the present invention will now be described in detail in accordance with the accompanying drawings.

As a result of studies conducted by the present inventors, it was found that, in the technique described in Japanese Patent Application Laid-Open No. 2006-11047, an extending direction of a groove shape is parallel to a rotation direction of the electrophotographic photosensitive drum. Therefore, it was found that, in particular, in a case where the abutting pressure of the cleaning blade is low, the residual toner on the outer surface of the electrophotographic photosensitive drum passes through the groove shape and slips through the abutting portion with the cleaning blade, resulting in the streaky image detects.

As a result of further studies conducted based on the above findings, it was found that, by forming a predetermined shape described below on the outer surface of the electrophotographic photosensitive drum, it is possible to highly achieve both a reduction in frictional force with the cleaning blade and suppression of the image defects caused by a cleaning failure.

Specifically, an outer surface of an electrophotographic photosensitive drum according to the present invention has wrinkles, and when an observation region having square form with one side of 100 μm is placed at an arbitrary position on the outer surface, a line that passes through a central point of the observation region and is parallel to a circumferential direction of the electrophotographic photosensitive drum is defined as a first reference line L1, and 3,599 reference lines obtained by rotating the first reference line L1 at every 0.1° around the central point are defined as L2 to L3,600, respectively, each of L1 to L3,600 intersects with convex portions of the wrinkles at a plurality of locations and has at least two different intersection angles selected from the plurality of locations.

Here, the arbitrary position does not refer to a specific position. That is, a sufficient requirement is not required for the electrophotographic photosensitive drum according to the present invention to satisfy the above conditions at a certain specific position, and it is required that the above conditions are satisfied even when the observation region is placed at any position on the outer surface of the electrophotographic photosensitive drum.

The wrinkles formed on the outer surface of the electrophotographic photosensitive drum according to the present invention have a certain degree or more of fineness, and have a predetermined number or more of convex portions in a certain range. Specifically, first, a square observation region with one side of 100 μm is placed at an arbitrary position on the outer surface of the electrophotographic photosensitive drum. Subsequently, a line that passes through the central point of the observation region and is parallel to a circumferential direction of the electrophotographic photosensitive drum is a first reference line L1. In addition, 3,599 reference lines obtained by rotating the first reference line L1 at every 0.1° around the central point are L2 to L3,600, respectively. In this case, the wrinkles formed on the outer surface of the electrophotographic photosensitive drum have a sufficient number of convex portions intersecting with each of L1 to L3,600 at the plurality of locations in the square observation region with one side of 100 μm.

In addition, the wrinkles formed on the outer surface of the electrophotographic photosensitive drum according to the present invention have a complex shape, and ridgelines of the convex portions are directed in various directions. Specifically, each of L1 to L3,600 has at least two different intersection angles selected from the plurality of locations at which each of L1 to L3,600 intersects with the convex portions of the wrinkles.

In addition, in the observation region on the outer surface of the electrophotographic photosensitive drum according to the present invention, the ridgelines of a plurality of mountainous wrinkles existing in an in-plane direction have a plurality of curvatures.

Figure 1B:
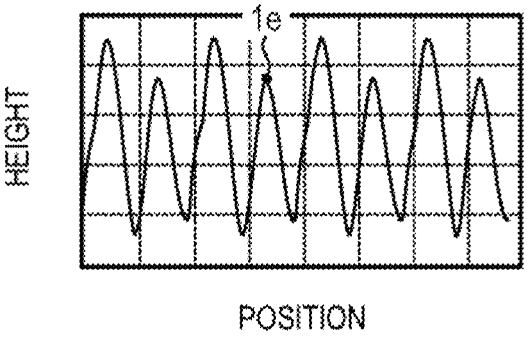
FIG. 1B is a graph showing height information obtained by observing the outer surface of the electrophotographic photosensitive drum in the example of the concave and convex shape of the wrinkle of the electrophotographic photosensitive drum according to the present invention.

FIGS. 1A and 1B are views illustrating an example of a concave and convex shape of the wrinkle formed on the electrophotographic photosensitive drum according to the present invention. FIG. 1A is a top view of the outer surface of the electrophotographic photosensitive drum, and FIG. 1B is a graph showing height information obtained by observing the outer surface of the electrophotographic photosensitive drum.

As illustrated in FIG. 1A, the mountainous wrinkles have striped concave and convex shapes that can be observed on the outer surface of the electrophotographic photosensitive drum. The striped shapes are not distributed in one direction, but are composed of a curved part, a discontinuous part, and a branched part, and a plurality of striped shapes exist in the square observation region with one side of 100 μm.

In addition, as illustrated in 1*a* of FIG. 1A, the ridgelines of the wrinkles refer to linear lines or curved lines formed by connecting the convex portions in the striped concave and convex shapes when observing the outer surface of the electrophotographic photosensitive drum.

A method of specifying the convex portions by observing the outer surface of the electrophotographic photosensitive drum to obtain the ridgelines is not particularly limited, but the ridgelines can be specified, for example, by image analysis of the height information obtained by measuring the outer surface of the electrophotographic photosensitive drum using a confocal laser scanning microscope. FIG. 1B illustrates an example of plotting the height information obtained as described above against a position on a straight line placed on the outer surface of the electrophotographic photosensitive drum. The apexes of the convex shapes illustrated in 1*e* of FIG. 1B are specified, such that the ridgelines of the wrinkles as illustrated in 1*a* of FIG. 1A can be obtained.

In addition, in the present invention, the ridgelines of the wrinkles have a plurality of curvatures in the ridgelines. The curvature is the amount representing a degree of bending of a curved line, and when a neighborhood of an arbitrary point on the curved line is approximated by a circle, a curvature χ is obtained as a reciprocal of a radius R of the circle as shown in Equation (I), $$\chi(s) = \frac{1}{R(s)} = \left|\frac{d^2r}{ds^2}\right| \tag{I}$$

where s represents a length of a portion corresponding to a circular arc of the curved line, and r is a position vector of the arbitrary point on the curved line.

For example, at the point shown as 1*b* of FIG. 1A, the curvature is large due to a large degree of bending of a ridgeline 1*a* of the wrinkle, and at the point shown as 1*c* of FIG. 1A, the curvature is small due to a small degree of bending of the ridgeline 1*a* of the wrinkle.

It is preferable that the ridgeline of the wrinkle has a plurality of inflection points in the square observation region with one side of 100 μm. The inflection point refers to a point where a curving direction of the curved line is changed as illustrated in 1*d* of FIG. 1A, and the curvature is zero at the inflection point.

A detailed action mechanism by which the present invention exerts its effects is presumed as follows. First, it is presumed that the wrinkles have a predetermined number or more of convex portions in a certain range, such that a contact area when the cleaning blade abuts against the electrophotographic photosensitive drum is reduced and the frictional force is thus reduced. Further, it is presumed that since the ridgelines of the convex portions of the wrinkles are directed in various directions, the toner passing through the concave portions is prevented from being slipping through when the electrophotographic photosensitive drum is rotated.

It is preferable that the electrophotographic photosensitive drum according to the present invention satisfies the following conditions.

That is, when a two-dimensional power spectrum F(r,θ) with a frequency component as r and an angle component as θ is obtained by performing frequency analysis of the height information of the wrinkles in the observation region, a one-dimensional radial direction distribution function p(r) obtained by integrating the two-dimensional power spectrum F(r,θ) in a θ direction has at least one maximum value, and when an angular distribution q(θ) is calculated from the two-dimensional power spectrum F(r,θ) at a frequency rp at which the one-dimensional radial direction distribution function p(r) has the maximum value, a variation in power values in the entire θ range is 10% or less.

As a result of studies conducted by the present inventors, it was found that in a case where the outer surface of the electrophotographic photosensitive drum has wrinkles and concave and convex shapes of the wrinkles have a predetermined periodicity as illustrated in FIGS. 1A and 1B, the effects of the present invention can be highly obtained.

As a method for obtaining the periodicity of the concave and convex shapes of the wrinkles is not particularly limited, but it is possible to use a method of acquiring height information by observing the outer surface of the electrophotographic photosensitive drum and then analyzing the obtained results by using two-dimensional Fourier transform.

Specifically, in a case where the height information of the wrinkles is obtained with the number of data $N_1 \times N_2$, when a height at an arbitrary point (n, m) in the in-plane is $h_{n,m}$, a two-dimensional power spectrum P(k,l) obtained by discrete Fourier transform is expressed by the following Equation (II).

$$P_{k,l} = \frac{1}{N_1 \cdot N_2}|f_{k,l}|^2 \tag{II}$$

Here, $f_{k,l}$ is expressed by the following Equation (III).

$$f_{k,l} = \sum_{n=0}^{N_1-1}\sum_{m=0}^{N_2-1} h_{n,m}e^{-ikn}e^{-ilm} \tag{III}$$

where k and l represent a frequency in a horizontal direction and a frequency in a vertical direction, respectively.

Further, a spectrum obtained by converting the two-dimensional power spectrum P(k,l) obtained by Equation (II) from an orthogonal coordinate system (k,l) into a polar coordinate system (r,θ) is represented by the two-dimensional power spectrum F(r,θ). Here, r and θ satisfy the following Equation (IV) and Equation (V), respectively.

$$r=\sqrt{k^2+l^2} \tag{IV}$$

$$\theta=\mathrm{Tan}^{-1}(l/k) \tag{V}$$

In the present invention, the height information obtained by measuring the square observation region with one side of 100 μm at a regular interval of 0.25 μm or less in each of two directions parallel to each side of the square is used for the analysis.

Figure 2A:
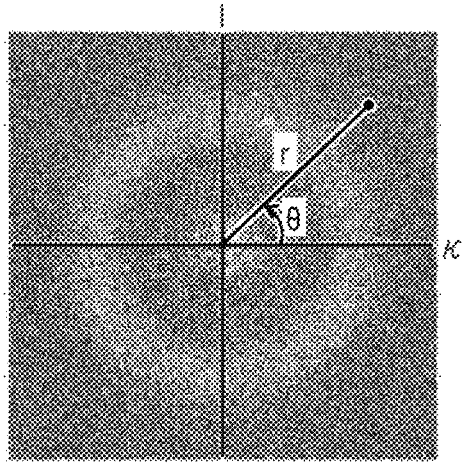
FIG. 2A is a view illustrating a two-dimensional power spectrum F(r,θ) obtained by analyzing a frequency of the wrinkles formed on the outer surface of the electrophotographic photosensitive drum according to the present invention.
Figure 2B:
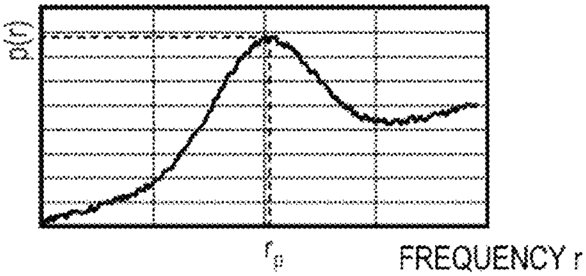
FIG. 2B is a view illustrating a one-dimensional radial direction distribution function obtained by integrating, in a θ direction, the two-dimensional power spectrum F(r,θ) obtained by analyzing the frequency of the wrinkles formed on the outer surface of the electrophotographic photosensitive drum according to the present invention.
Figure 2C:
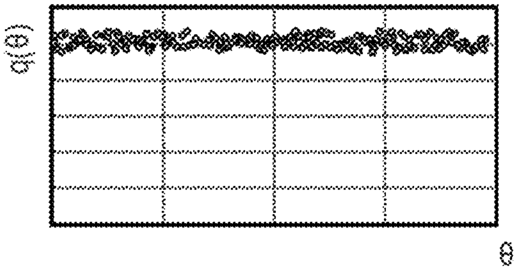
FIG. 2C is a view illustrating a variation in power values in the entire θ range when an angular distribution q(θ) is calculated from the two-dimensional power spectrum F(r,θ) at a frequency rp at which the one-dimensional radial direction distribution function p(r) has a maximum value, the one-dimensional radial direction distribution function p(r) being obtained by integrating, in the 0 direction, the two-dimensional power spectrum F(r,θ) obtained by performing frequency analysis of the wrinkles formed on the outer surface of the electrophotographic photosensitive drum according to the present invention.

FIGS. 2A to 2C are views illustrating an example of the result obtained by numerical analysis of the electrophotographic photosensitive drum according to the present invention. FIG. 2A is a view illustrating the two-dimensional power spectrum F(r,θ) obtained by analyzing the frequency of the wrinkles formed on the outer surface of the electrophotographic photosensitive drum. In addition, FIG. 2B is a view illustrating the one-dimensional radial direction distribution function obtained by integrating the obtained two-dimensional power spectrum F(r,θ) in the θ direction. In addition, FIG. 2C is a view illustrating the variation in power values in the entire θ range when the angular distribution q(θ) is calculated from the two-dimensional power spectrum F(r,θ) at the frequency rp at which the one-dimensional radial direction distribution function p(r) has the maximum value.

As illustrated in FIG. 2B, it is preferable that in the electrophotographic photosensitive drum according to the present invention, the radial direction distribution function p(r) obtained by making the two-dimensional power spectrum F(r,θ) one-dimensional in the radial direction has at least one maximum value. This means that the concave and convex shapes of the wrinkles formed on the outer surface of the electrophotographic photosensitive drum are distributed at regular intervals.

In addition, as illustrated in FIG. 2C, when the angular distribution q(θ) of F(rp,θ) is calculated at the frequency rp at which p(r) is maximized, the variation in power values in the entire θ range is preferably within a predetermined range, and specifically, it is preferably 10% or less. This means that the concave and convex shapes of the wrinkles formed on the outer surface of the electrophotographic photosensitive drum are evenly distributed with the periodicity in an arbitrary direction in the in-plane of the electrophotographic photosensitive drum.

In addition, a difference Δ between an average value hm and an average value $h_{ave}$ of heights of the wrinkles in the observation region is preferably in a range of 0.5 to 2.0 μm, in which the average value hm is a value obtained by arbitrarily selecting five points of apexes of the convex portions of the wrinkles in the observation region and averaging heights of the apexes of the convex portions of the wrinkles at the selected five points. Here, the selected arbitrary five points does not refer to specific five points. That is, it means that the same results as described above are obtained even in a case where any five points are selected.

Further, the frequency rp at which the radial direction distribution function p(r) has the maximum value is preferably in a range of 0.05 to 1.00 $\mu m^{-1}$.

Electrophotographic Photosensitive Drum

The electrophotographic photosensitive drum according to the present invention includes a support and a photosensitive layer.

An example of a method of producing an electrophotographic photosensitive drum can include a method in which coating liquids for layers to be described below are prepared and applied on the layers in a desired order and the coating liquids are dried. In this case, examples of a method of applying the coating liquid can include dip coating, spray coating, ink jet coating, roll coating, die coating, blade coating, curtain coating, wire bar coating, and ring coating. Among them, dip coating is preferred from the viewpoints of efficiency and productivity.

Hereinafter, the support and the respective layers will be described.

Support

In the present invention, the electrophotographic photosensitive drum includes a support. In the present invention, the support is preferably an electroconductive support having electroconductivity. In addition, a shape of the support is preferably a cylindrical shape. In addition, a surface of the support may be subjected to an electrochemical treatment such as anodization, a blast treatment, or a cutting treatment.

As a material for the support, a metal, a resin, or glass is preferred.

Examples of the metal can include aluminum, iron, nickel, copper, gold, and stainless steel, or alloys thereof. Among them, an aluminum support obtained by using aluminum is preferred.

In addition, electroconductivity may be imparted through a treatment such as mixing or coating the resin or glass with an electroconductive material.

Electroconductive Layer

In the present invention, an electroconductive layer may be provided on the support. By providing the electroconductive layer, scratches or unevenness on the surface of the support can be concealed, or reflection of light on the surface of the support can be controlled.

The electroconductive layer preferably contains electroconductive particles and a resin.

Examples of a material for the electroconductive particle can include a metal oxide, a metal, and carbon black.

Examples of the metal oxide can include zinc oxide, aluminum oxide, indium oxide, silicon oxide, zirconium oxide, tin oxide, titanium oxide, magnesium oxide, antimony oxide, and bismuth oxide. Examples of the metal can include aluminum, nickel, iron, nichrome, copper, zinc, and silver.

Among them, the metal oxide is preferably used for the electroconductive particle. In particular, titanium oxide, tin oxide, or zinc oxide is more preferably used for the electroconductive particle.

In a case where the metal oxide is used for the electroconductive particle, a surface of the metal oxide may be treated with a silane coupling agent or the like, or the metal oxide may be doped with an element such as phosphorus or aluminum, or an oxide thereof.

In addition, the electroconductive particle may have a laminate structure having a core particle and a coating layer that coats the core particle. Examples of a material for the core particle can include titanium oxide, barium sulfate, and zinc oxide. An example of a material for the coating layer can include a metal oxide such as tin oxide.

In addition, in a case where the metal oxide is used for the electroconductive particle, a volume average particle size of the electroconductive particles is preferably 1 to 500 nm, and more preferably 3 to 400 nm.

Examples of the resin can include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a masking agent such as silicone oil, resin particles, or titanium oxide.

An average thickness of the electroconductive layer is preferably 1 to 50 μm, and particularly preferably 3 to 40 μm.

The electroconductive layer can be formed by preparing a coating liquid for an electroconductive layer containing the above-described respective materials and a solvent, forming a coating film thereof, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent. Examples of a method for dispersing the electroconductive particles in the coating liquid for an electroconductive layer can include methods using a paint shaker, a sand mill, a ball mill, and a liquid collision-type high-speed disperser.

Undercoat Layer

In the present invention, an undercoat layer may be provided on the support or the electroconductive layer. By providing the undercoat layer, an adhesive function between layers can be increased to impart a charge injection inhibiting function.

The undercoat layer preferably contains a resin. In addition, the undercoat layer may be formed as a cured film by polymerization of a composition containing a monomer having a polymerizable functional group.

Examples of the resin can include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin, and a cellulose resin.

Examples of the polymerizable functional group included in the monomer having the polymerizable functional group can include an isocyanate group, a block isocyanate group, a methylol group, an alkylated methylol group, an epoxy group, a metal alkoxide group, a hydroxyl group, an amino group, a carboxyl group, a thiol group, a carboxylic acid anhydride group, and a carbon-carbon double bond group.

In addition, the undercoat layer may further contain an electron transporting substance, a metal oxide, a metal, an electroconductive polymer, and the like, in order to improve electric characteristics. Among them, an electron transporting substance or a metal oxide is preferably used.

Examples of the electron transporting substance can include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron transporting substance having a polymerizable functional group may be used as the electron transporting substance and copolymerized with the above-described monomer having the polymerizable functional group to form an undercoat layer as a cured film.

Examples of the metal oxide can include indium tin oxide, tin oxide, indium oxide, titanium oxide, zinc oxide, aluminum oxide, and silicon dioxide. Examples of the metal can include gold, silver, and aluminum.

In addition, the undercoat layer may further contain an additive.

An average thickness of the undercoat layer is preferably 0.1 to 50 μm, more preferably 0.2 to 40 μm, and particularly preferably 0.3 to 30 μm.

The undercoat layer can be formed by preparing a coating liquid for an undercoat layer containing the above-described respective materials and a solvent, forming a coating film thereof, and drying and/or curing the coating film. Examples of the solvent used in the coating liquid can include an alcohol-based solvent, a ketone-based solvent, an ether-based solvent, an ester-based solvent, and an aromatic hydrocarbon-based solvent.

Photosensitive Layer

The photosensitive layer of the electrophotographic photosensitive drum is mainly classified into (1) a laminate type photosensitive layer and (2) a monolayer type photosensitive layer. (1) The laminate type photosensitive layer includes a charge generation layer containing a charge generating substance and a charge transport layer containing a charge transporting substance. (2) The monolayer type photosensitive layer includes a photosensitive layer containing both a charge generating substance and a charge transporting substance.

(1) Laminate Type Photosensitive Layer

The laminate type photosensitive layer includes a charge generation layer and a charge transport layer.

(1-1) Charge Generation Layer

The charge generation layer preferably contains a charge generating substance and a resin.

Examples of the charge generating substance can include an azo pigment, a perylene pigment, a polycyclic quinone pigment, an indigo pigment, and a phthalocyanine pigment. Among them, an azo pigment or a phthalocyanine pigment is preferred. Among the phthalocyanine pigments, an oxytitanium phthalocyanine pigment, a chlorogallium phthalocyanine pigment, or a hydroxygallium phthalocyanine pigment is preferred.

A content of the charge generating substance in the charge generation layer is preferably 40 to 85% by mass, and more preferably 60 to 80% by mass, with respect to a total mass of the charge generation layer.

Examples of the resin can include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Among them, a polyvinyl butyral resin is more preferred.

In addition, the charge generation layer may further contain an additive such as an antioxidant or an ultraviolet absorber. Specific examples thereof can include a hindered phenol compound, a hindered amine compound, a sulfur compound, a phosphorus compound, and a benzophenone compound.

An average thickness of the charge generation layer is preferably 0.1 to 1 μm, and more preferably 0.15 to 0.4 μm.

The charge generation layer can be formed by preparing a coating liquid for a charge generation layer containing the above-described respective materials and a solvent, forming a coating film thereof, and drying the coating film. Examples of the solvent used in the coating liquid can include an alcohol-based solvent, a sulfoxide-based solvent, a ketone-based solvent, an ether-based solvent, an ester-based solvent, and an aromatic hydrocarbon-based solvent.

(1-2) Charge Transport Layer

The charge transport layer preferably contains a charge transporting substance and a resin.

Examples of the charge transporting substance can include a polycyclic aromatic compound, a heterocyclic compound, a hydrazone compound, a styryl compound, an enamine compound, a benzidine compound, a triarylamine compound, and a resin having a group derived from these substances. Among them, a triarylamine compound or a benzidine compound is preferably used, and a compound represented by the following Structural Formula (1) is appropriately used.

(1)
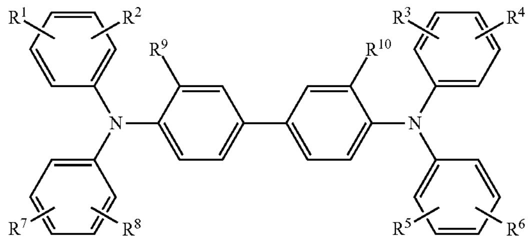
wherein $R^1$ to $R^{10}$ each independently represent a hydrogen atom or a methyl group.
Examples of a structure represented by Structural Formula (1) are shown in Structural Formula (1-1) to Structural Formula (1-10). Among them, compounds having the structures represented by Structural Formula (1-1) to Structural Formula (1-6) are more preferred.
(1-1)
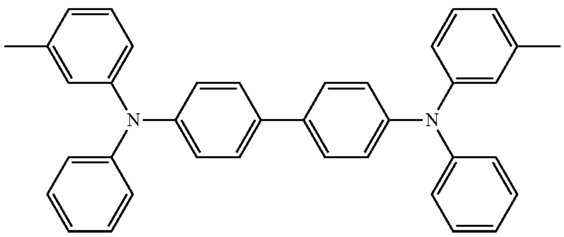
(1-2)
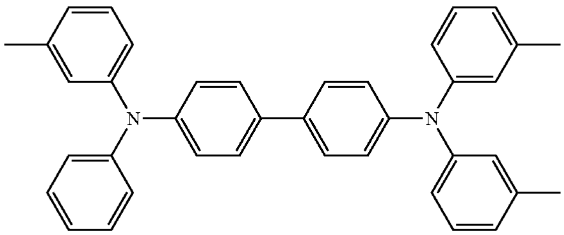
(1-3)
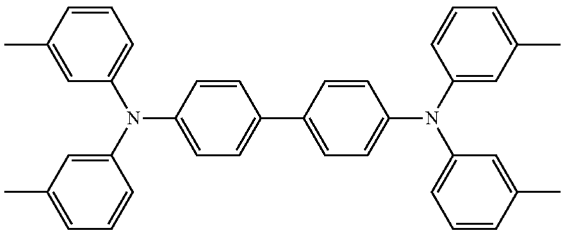
(1-4)
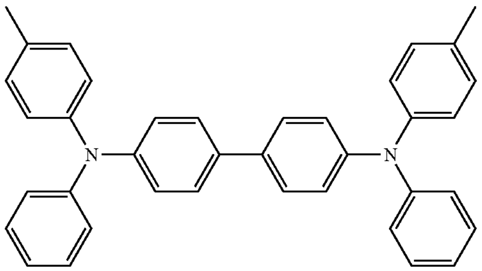
-continued
(1-5)
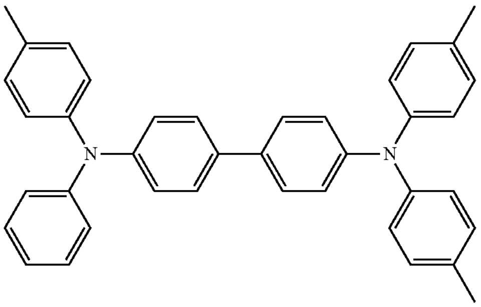
(1-6)
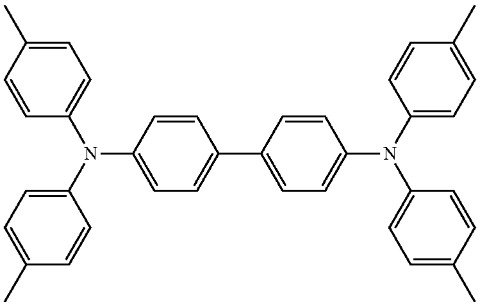
(1-7)
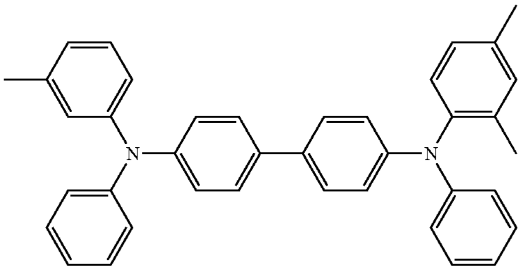
(1-8)
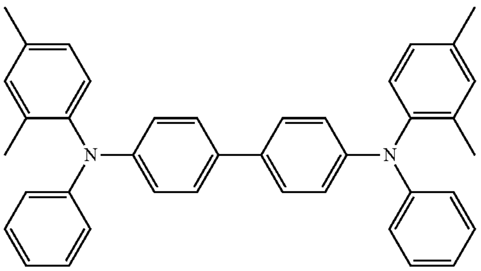
(1-9)
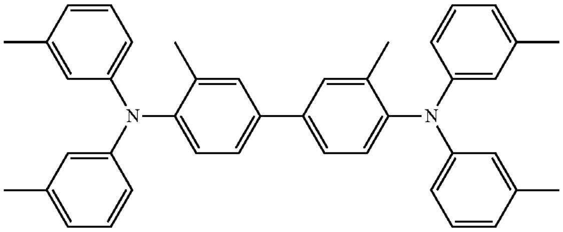

-continued (1-10)

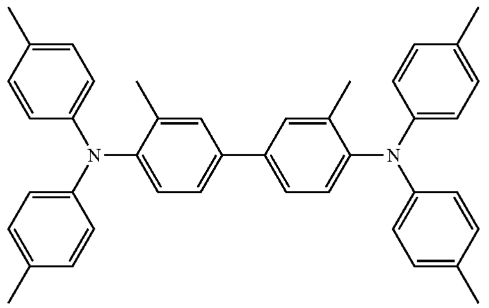

A thermoplastic resin is used as the resin, and examples of the resin can include a polyester resin, a polycarbonate resin, an acrylic resin, and a polystyrene resin. Among them, a polycarbonate resin or a polyester resin is preferred. As the polyester resin, a polyarylate resin is particularly preferred.

A content of the charge transporting substance in the charge transport layer is preferably 25 70% by mass, and more preferably 30 55% by mass, with respect to a total mass of the charge transport layer.

A content ratio (mass ratio) of the charge transporting substance to the resin is preferably 4:10 to 20:10 and more preferably 5:10 to 12:10.

The charge transport layer can be formed by dissolving the charge transporting substance and a binder resin in a solvent to prepare a coating film of a coating liquid for a charge transport layer, and drying a coating film of the coating liquid. Examples of the solvent used in the coating liquid for forming the charge transport layer can include an alcohol-based solvent, a sulfoxide-based solvent, a ketone-based solvent, an ether-based solvent, an ester-based solvent, and an aromatic hydrocarbon-based solvent.

In addition, the charge transport layer may also contain an additive such as an antioxidant, an ultraviolet absorber, a plasticizer, a leveling agent, a lubricity imparting agent, or an abrasion resistance improver.

Specific examples thereof can include a hindered phenol compound, a hindered amine compound, a sulfur compound, a phosphorus compound, a benzophenone compound, a siloxane-modified resin, silicone oil, a fluorine resin particle, a polystyrene resin particle, a polyethylene resin particle, an alumina particle, and a boron nitride particle.

An average thickness of the charge transport layer is preferably 5 to 50 μm, more preferably 8 to 40 μm, and particularly preferably 10 to 30 μm.

The charge transport layer can be formed by preparing a coating liquid for a charge transport layer containing the above-described respective materials and a solvent, forming a coating film thereof, and drying the coating film. Examples of the solvent used in the coating liquid can include an alcohol-based solvent, a ketone-based solvent, an ether-based solvent, an ester-based solvent, and an aromatic hydrocarbon-based solvent. Among these solvents, an ether-based solvent or an aromatic hydrocarbon-based solvent is preferred.

Protection Layer

In the electrophotographic photosensitive drum of the present invention, a protection layer may be provided on the photosensitive layer as long as the effects of the present invention are not impaired. By providing the protection layer, durability can be improved.

The protection layer preferably contains electroconductive particles and/or a charge transporting substance, and a resin.

Examples of the electroconductive particle can include metal oxides such as titanium oxide, zinc oxide, tin oxide, and indium oxide.

Examples of the charge transporting substance can include a polycyclic aromatic compound, a heterocyclic compound, a hydrazone compound, a styryl compound, an enamine compound, a benzidine compound, a triarylamine compound, and a resin having a group derived from these substances. Among them, a triarylamine compound or a benzidine compound is preferred.

Examples of the resin can include a polyester resin, an acrylic resin, a phenoxy resin, a polycarbonate resin, a polystyrene resin, a phenol resin, a melamine resin, and an epoxy resin. Among them, a polycarbonate resin, a polyester resin, or an acrylic resin is preferred.

In addition, the protection layer may also be formed as a cured film by polymerization of a composition containing a monomer having a polymerizable functional group. Examples of the reaction in this case can include a thermal polymerization reaction, a photopolymerization reaction, and a radiation polymerization reaction. Examples of the polymerizable functional group included in the monomer having a polymerizable functional group can include an acryloyloxy group and a methacryloyloxy group. A material having charge transporting ability may also be used as the monomer having a polymerizable functional group. As the charge transporting structure, a triarylamine structure is preferred in terms of charge transportation. Examples of the polymerizable functional group included in the material having charge transporting ability can include an acryloyloxy group and a methacryloyloxy group. The number of polymerizable functional groups included in the monomer having a polymerizable functional group may be one or more. It is particularly preferable that a cured film is formed by polymerizing a composition containing both a compound having a plurality of polymerizable functional groups and a compound having one polymerizable functional group in terms of easily eliminating strain generated in the polymerization of the plurality of polymerizable functional groups.

Examples of the compound having one polymerizable functional group are shown in Structural Formula (2-1) to Structural Formula (2-6).

(2-1)

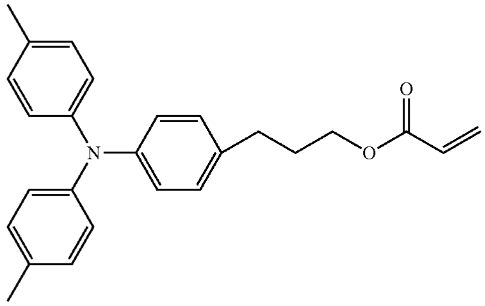

-continued
(2-2)
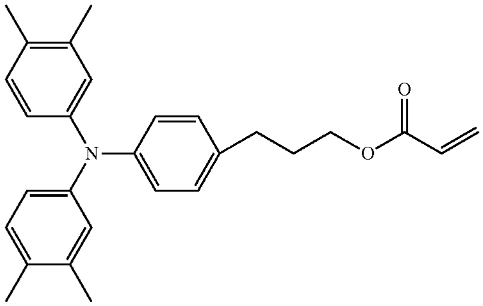
(2-3)
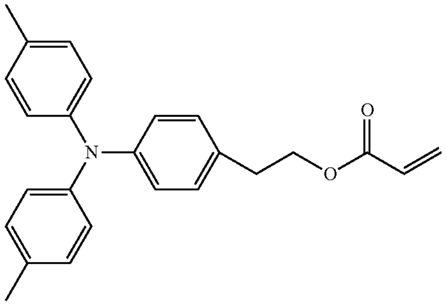
(2-4)
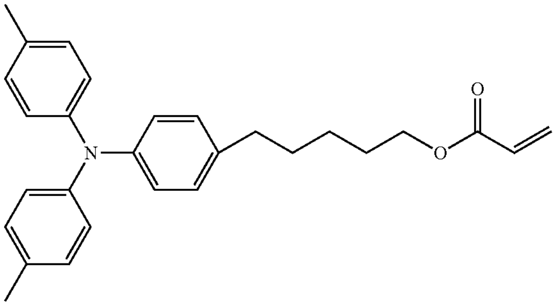
-continued
(2-5)
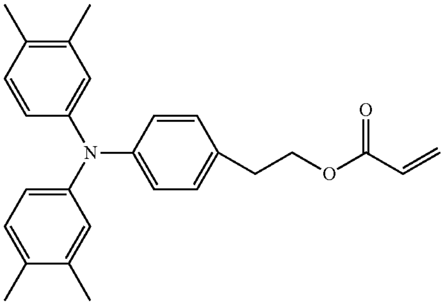
(2-6)
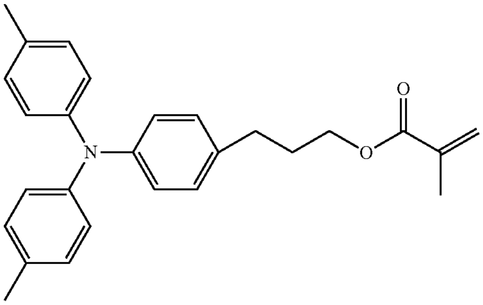
Examples of the compound having a plurality of polymerizable functional groups are shown in Structural Formula (3-1) to Structural Formula (3-7).
(3-1)
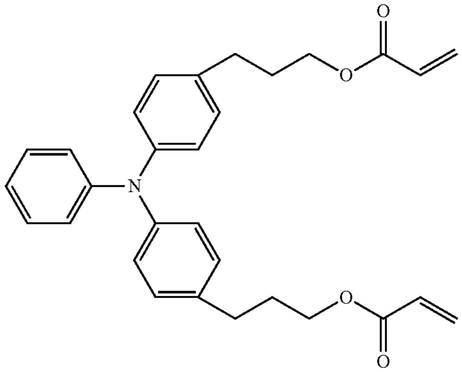
(3-2)
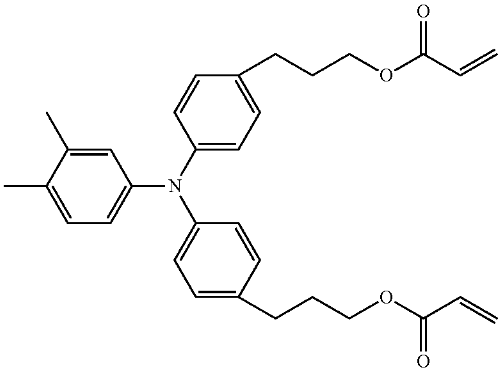

-continued (3-3)

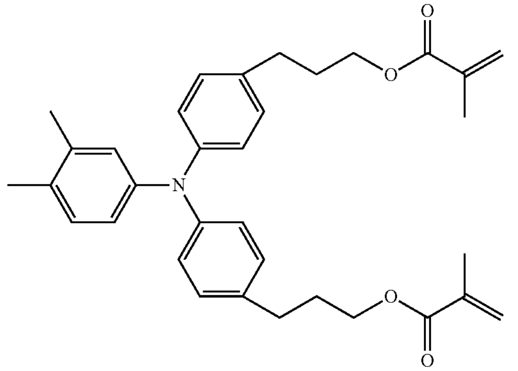

(3-4)

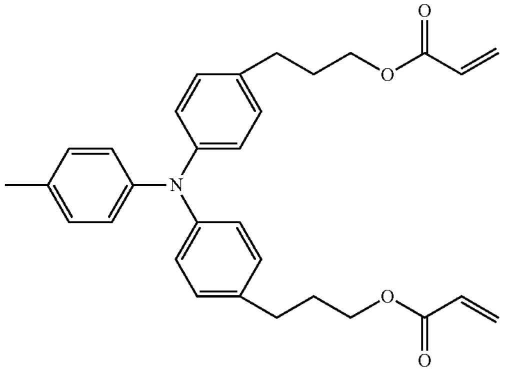

(3-5)

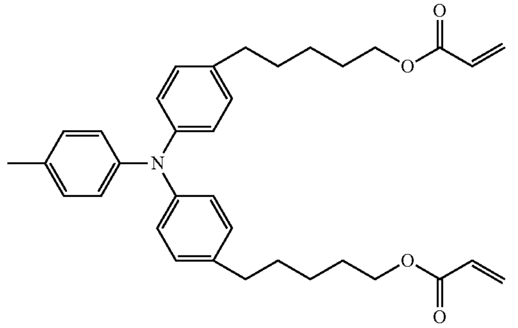

(3-6)

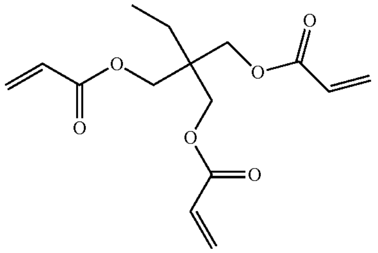

(3-7)

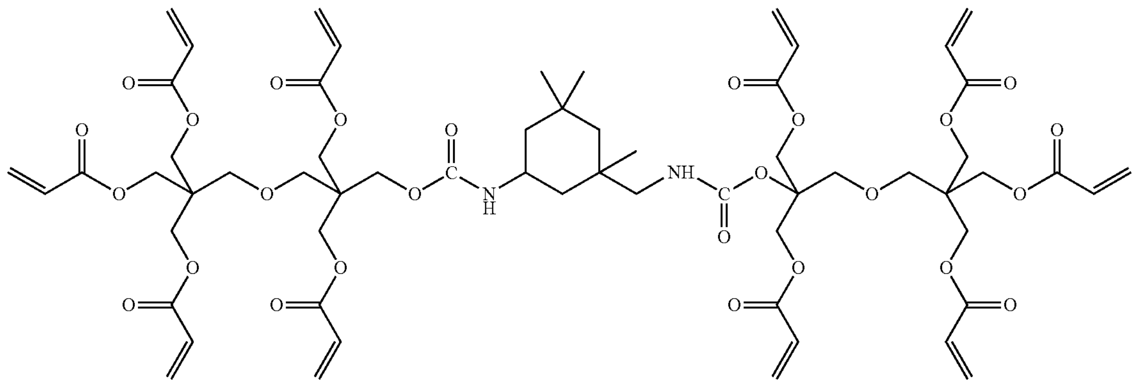

The protection layer may also contain an additive such as an antioxidant, an ultraviolet absorber, a plasticizer, a leveling agent, a lubricity imparting agent, or an abrasion resistance improver. Specific examples thereof can include a hindered phenol compound, a hindered amine compound, a sulfur compound, a phosphorus compound, a benzophenone compound, a siloxane-modified resin, silicone oil, a fluorine resin particle, a polystyrene resin particle, a polyethylene resin particle, a silica particle, an alumina particle, and a boron nitride particle.

An average thickness of the protection layer is preferably 0.2 to 10 μm, and more preferably 0.3 to 7 μm.

The protection layer can be formed by preparing a coating liquid for a protection layer containing the respective materials and a solvent, forming a coating film thereof, and drying and/or curing the coating film. Examples of the solvent used in the coating liquid can include an alcohol-based solvent, a ketone-based solvent, an ether-based solvent, a sulfoxide-based solvent, an ester-based solvent, and an aromatic hydrocarbon-based solvent.

Process Cartridge and Electrophotographic Apparatus

A process cartridge according to the present invention integrally supports the electrophotographic photosensitive drum described above and at least one unit selected from the group consisting of a charging unit, a developing unit, and a cleaning unit, and is detachably attachable to a main body of an electrophotographic apparatus.

In addition, the electrophotographic apparatus according to the present invention includes the electrophotographic photosensitive drum described above, a charging unit, an exposing unit, a developing unit, and a transfer unit.

Figure 3:
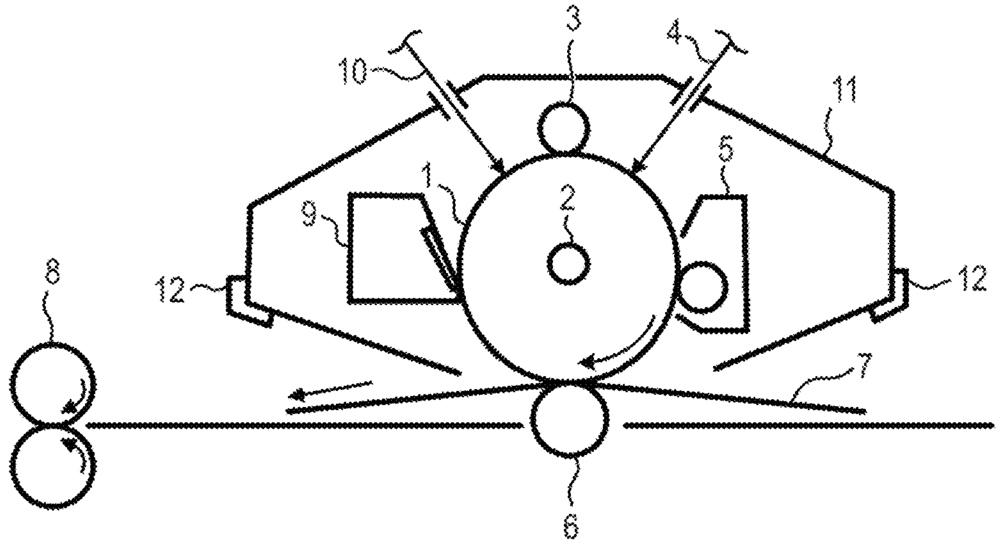
FIG. 3 is a view illustrating a schematic configuration of an electrophotographic apparatus including a process cartridge including the electrophotographic photosensitive drum.

FIG. 3 illustrates an example of a schematic configuration of an electrophotographic apparatus including a process cartridge 11 including an electrophotographic photosensitive drum 1.

Reference numeral 1 represents a cylindrical electrophotographic photosensitive drum, and the cylindrical electrophotographic photosensitive drum is rotatably driven about a shaft 2 in the arrow direction at a predetermined peripheral velocity. An outer surface of the electrophotographic photosensitive drum 1 is charged with a predetermined positive or negative potential by a charging unit 3. Although a roller charging system using the roller type charging unit 3 is illustrated in FIG. 3, a charging system such as a corona charging system, a proximity charging system, or an injection charging system may also be adopted. The outer surface of the charged electrophotographic photosensitive drum 1 is irradiated with exposure light 4 emitted from an exposing unit (not illustrated), and an electrostatic latent image corresponding to target image information is formed on the outer surface of the electrophotographic photosensitive drum 1. The electrostatic latent image formed on the outer surface of the electrophotographic photosensitive drum 1 is developed with a toner stored in a developing unit 5, and a toner image is formed on the outer surface of the electrophotographic photosensitive drum 1. The toner image formed on the outer surface of the electrophotographic photosensitive drum 1 is transferred onto a transfer material 7 by a transfer unit 6. The transfer material 7 onto which the toner image is transferred is conveyed to a fixing unit 8 to perform a fixing treatment on the toner image. Thus, the transfer material 7 is printed out the outside of the electrophotographic apparatus. The electrophotographic apparatus may also include a cleaning unit 9 for removing an adhered material such as the toner remaining on the outer surface of the electrophotographic photosensitive drum 1 after the transfer. The electrophotographic apparatus may also include an antistatic mechanism for an antistatic treatment performed on the outer surface of the electrophotographic photosensitive drum 1 by pre-exposure light 10 from a pre-exposing unit (not illustrated). In addition, a guiding unit 12 such as a rail may be provided for detachably attaching the process cartridge 11 according to the present invention to the main body of the electrophotographic apparatus.

The electrophotographic photosensitive drum according to the present invention can be used in, for example, a laser beam printer, an LED printer, a copying machine, a facsimile, and a composite machine thereof.

According to the present invention, it is possible to provide an electrophotographic photosensitive drum capable of reducing a frictional force with a cleaning blade and further exhibiting high cleanability even in a case where an abutting pressure of the cleaning blade is low.

EXAMPLES

Hereinafter, although the present invention will be described in more detail by Examples and Comparative Examples, the present invention is not limited to these Examples. In Examples and Comparative Examples, “part(s)” refer to “part(s) by mass”.

Production of Electrophotographic Photosensitive Drum

Example 1

An aluminum cylinder (JIS-A3003, aluminum alloy) having a diameter of 24 mm and a length of 257.5 mm was used as a support (electroconductive support).

Electroconductive Layer

Next, the following materials were prepared.

214 parts of titanium oxide ($TiO_2$) particles (average primary particle size of 230 nm) coated with oxygen-deficient tin oxide ($SnO_2$) as metal oxide particles 132 parts of phenol resin (monomer/oligomer of phenol resin) (trade name: Plyophen J-325, resin solid content: 60% by mass, manufactured by Dainippon Ink And Chemicals, Inc.) as binder material 98 parts of 1-methoxy-2-propanol as solvent These materials were added to a sand mill including 450 parts of glass beads having a diameter of 0.8 mm, and a dispersion treatment was performed under conditions of a rotation speed of 2,000 rpm, a dispersion treatment time of 4.5 hours, and a cooling water setting temperature of 18° C., thereby obtaining a dispersion.

The glass beads were removed from the dispersion with a mesh (opening: 150 μm). Silicone resin particles (trade name: TOSPEARL 120, average particle size of 2 μm, manufactured by Momentive Performance Materials, Inc.) as a surface roughness-imparting agent were added to the obtained dispersion. An addition amount of the silicone resin particles was set to 10% by mass with respect to a total mass of the metal oxide particles and the binder material in the dispersion after the glass beads were removed. In addition, silicone oil (trade name: SH28PA, manufactured by Dow Corning Toray Co., Ltd.) as a leveling agent was added to the dispersion so that a content of the silicone oil was 0.01% by mass with respect to the total mass of the metal oxide particles and the binder material in the dispersion.

Next, a solvent in which methanol and 1-methoxy-2-propanol (mass ratio: 1:1) were mixed with each other was added to the dispersion so that a total mass (that is, a mass of a solid content) of the metal oxide particles, the binder material, and the surface roughness-imparting agent in the dispersion was 67% by mass with respect to a mass of the dispersion. Thereafter, a coating liquid for an electroconductive layer was prepared by stirring the mixture. The coating liquid for an electroconductive layer was applied onto the support by dip coating, and heating was performed at 140° C. for 1 hour, thereby forming an electroconductive layer having a thickness of 30 μm.

Undercoat Layer

Next, the following materials were prepared.

4 parts of charge transporting substance (Structural Formula E-1)

5.5 parts of blocked isocyanate (trade name: Duranate SBN-70D, manufactured by Asahi Kasei Corporation)

0.3 parts of polyvinyl butyral resin (trade name: KS-5Z, manufactured by SEKISUI CHEMICAL CO., LTD.)

0.05 parts of zinc (II) hexanoate (manufactured by Mitsuwa Chemical Co., Ltd.) as catalyst These materials were dissolved in a solvent in which 50 parts of tetrahydrofuran and 50 parts of 1-methoxy-2-propanol were mixed with each other, thereby preparing a coating liquid for an undercoat layer. The coating liquid for an undercoat layer was applied onto the electroconductive layer by dip coating, and heating was performed at 170° C. for 30 minutes, thereby forming an undercoat layer having a thickness of 0.7 μm.

(E-1)

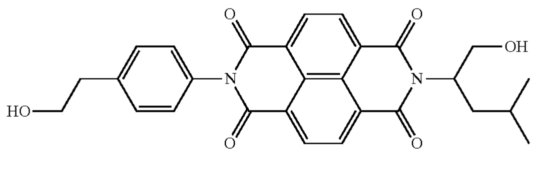

Charge Generation Layer

Next, 10 parts of crystalline hydroxygallium phthalocyanine having peaks at positions of 7.5° and 28.4° in a chart obtained by CuKα characteristic X-ray diffraction and 5 parts of a polyvinyl butyral resin (trade name: S-LEC BX-1, manufactured by SEKISUI CHEMICAL CO., LTD.) were prepared. These materials were added to 200 parts of cyclohexanone and dispersed with a sand mill device using glass beads having a diameter of 0.9 mm for 6 hours. Cyclohexanone and ethyl acetate were further added thereto in amounts of 150 parts and 350 parts, respectively, and diluted, thereby obtaining a coating liquid for a charge generation layer. The obtained coating liquid was applied onto the undercoat layer by dip coating, and drying was performed at 95° C. for 10 minutes, thereby forming a charge generation layer having a thickness of 0.20 μm.

Measurement of X-ray diffraction was performed under the following conditions.

Powder X-ray diffraction measurement

Used measuring machine: X-ray diffractometer RINT-TTRII, manufactured by Rigaku Corporation X-ray tube bulb: Cu Tube voltage: 50 KV Tube current: 300 mA Scanning method: 2θ/θ scan Scanning rate: 4.0°/min Sampling interval: 0.02°

Start angle (2θ): 5.0°

Stop angle (2θ): 40.0°

Attachment: standard sample holder

Filter: not used

Incident monochrome: used

Counter monochromator: not used

Divergence slit: open

Divergence longitudinal restriction slit: 10.00 mm

Scattering slit: open

Light-receiving slit: open

Flat monochromator: used

Counter: scintillation counter

Charge transport layer

Next, the following materials were prepared.

- 5 parts of charge transporting substance (hole transporting substance) represented by Structural Formula (1-1)
- 5 parts of charge transporting substance (hole transporting substance) represented by Structural Formula (1-3)
- 10 parts of polycarbonate resin (trade name: Iupilon Z400, produced by Mitsubishi Engineering-Plastics Corporation)
- 0.02 parts of polycarbonate resin having copolymerization unit of the following Formulas (C-4) and (C-5) (x/y=0.95/0.05: viscosity average molecular weight=20,000)

These materials were dissolved in a solvent in which 60 parts of toluene, 2.3 parts of methyl benzoate, and 12.8 parts of tetrahydrofuran were mixed with each other, thereby preparing a coating liquid for a charge transport layer. The coating liquid for a charge transport layer was applied onto the charge generation layer by dip coating to form a coating film, and the coating film was dried at 100° C. for 20 minutes, thereby forming a charge transport layer having a thickness of 16 μm.

(C-4)

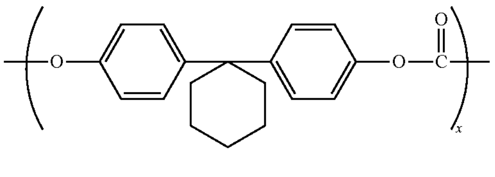

-continued (C-5)

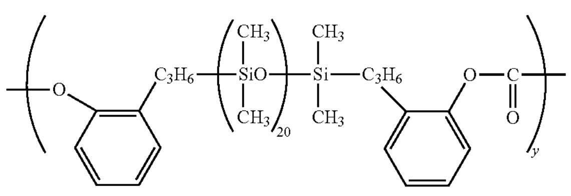

Protection Layer

Next, the following materials were prepared.

- 8 parts of compound represented by Structural Formula (2-1)
- 16 parts of compound represented by Structural Formula (3-1)
  - 0.1 parts of siloxane-modified acrylic compound (SYMAC US-270, manufactured by Toagosei Co., Ltd.)

These materials were mixed and stirred with 58 parts of cyclohexane and 25 parts of 1-propanol. As described above, a coating liquid for a protection layer was prepared.

The coating liquid for a protection layer was applied onto the charge transport layer by dip coating to form a coating film, and the obtained coating film was dried at 40° C. for 5 minutes. Thereafter, the coating film was irradiated with electron beams for 1.6 seconds in a nitrogen atmosphere while rotating a support (an object to be irradiated) at a speed of 300 rpm under conditions of an acceleration voltage of 70 kV and a beam current of 5.0 mA. A dose at a position of the outermost surface layer when irradiating the electron beams was 15 kGy.

Thereafter, first heating was performed by raising the temperature from 25° C. to 100° C. for 20 seconds under a nitrogen atmosphere, thereby forming a protection layer having a thickness of 0.3 μm. An oxygen concentration from electron beam irradiation to a subsequent heat treatment was 10 ppm or less.

Next, the coating film was naturally cooled in the atmospheric air until the temperature of the coating film was 25° C., and then the coating film was subjected to a second heat treatment under a condition in which the temperature of the coating film was 220° C. for 15 minutes, thereby forming a wrinkle shape. As described above, an electrophotographic photosensitive drum according to Example 1 was produced.

Examples 2 to 17

In Example 1, each of the type of the charge transporting substance used in the formation of the charge transport layer, the type of the monomer having the polymerizable functional group used in the formation of the protection layer, and the thickness of the protection layer was set as shown in Table 1. Each of electrophotographic photosensitive drums according to Examples 2 to 17 was produced in the same manner as that of Example 1 except for this.

Comparative Example 1

Figure 4:
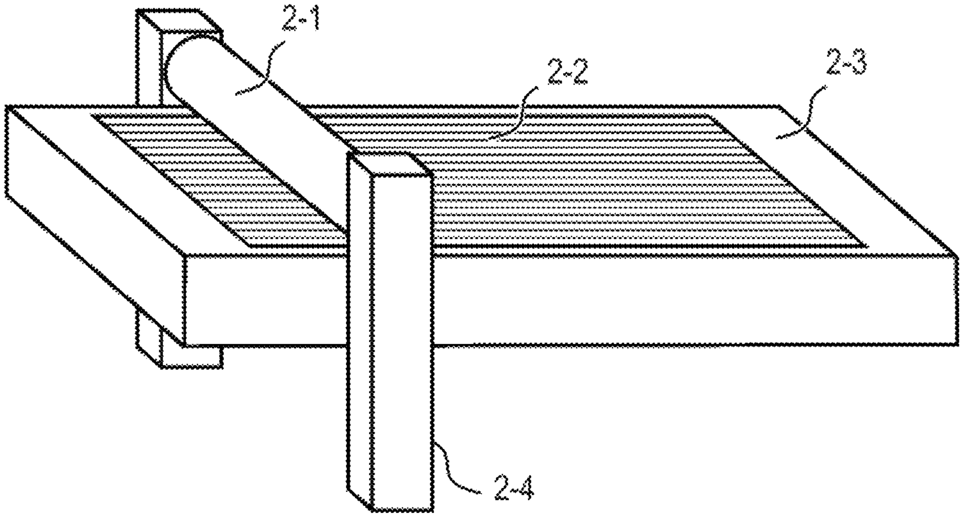
FIG. 4 is a view illustrating a polisher used for polishing the outer surface of the electrophotographic photosensitive drum according to a comparative example.

An electrophotographic photosensitive drum produced without performing the second heat treatment in the formation of the protection layer in the Example 1 was prepared. An outer surface of the electrophotographic photosensitive drum was polished using a polisher illustrated in FIG. 4 under the following conditions.

Feeding speed of polishing sheet: 400 mm/min

Rotation speed of electrophotographic photosensitive drum: 240 rpm

Polishing abrasive grains: silicon carbide

Average particle size of polishing abrasive grains: 3 μm

Polishing time: 20 seconds

Figure 5:
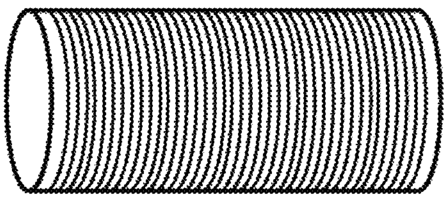
FIG. 5 is a schematic view illustrating a shape of the outer surface of the electrophotographic photosensitive drum according to a comparative example.

A layer 2-2 obtained by dispersing polishing abrasive grains in a binder resin and provided on a sheet-like substrate 2-3 was used as a polishing sheet. An outer surface of an electrophotographic photosensitive drum 2-1 was subjected to a roughening treatment by vertically pressing a surface of the polishing sheet by a vertical mechanism 2-4 for 20 seconds while feeding the polishing sheet parallel to the surface of the polishing sheet and rotating the electrophotographic photosensitive drum 2-1. By doing so, as illustrated in FIG. 5, an electrophotographic photosensitive drum according to Comparative Example 1 was produced, the electrophotographic photosensitive drum having an outer surface in which a plurality of parallel groove shapes extending in a circumferential direction of the electrophotographic photosensitive drum were formed.

Comparative Example 2

In the formation of the protection layer in Example 1, an electrophotographic photosensitive drum produced without performing the second heat treatment was prepared, and then, the same roughening treatment as that of Comparative Example 1 was performed.

Figure 6:
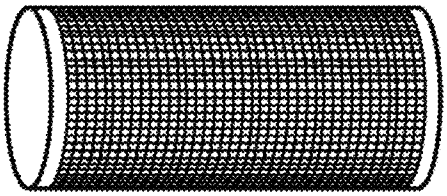
FIG. 6 is a schematic view illustrating a shape of the outer surface of the electrophotographic photosensitive drum according to a comparative example.

Next, the electrophotographic photosensitive drum 2-1 was fixed, and the polishing sheet was fed parallel to an axial direction of the electrophotographic photosensitive drum 2-1 to perform a roughening treatment on the outer surface of the electrophotographic photosensitive drum 2-1. The roughening treatment was repeated by changing an angle of a rotation direction of the electrophotographic photosensitive drum 2-1. By doing so, as illustrated in FIG. 6, an electrophotographic photosensitive drum according to Comparative Example 2 was produced, the electrophotographic photosensitive drum having an outer surface on which a groove shape was formed in a grid shape.

Evaluation

The following evaluations were performed on the electrophotographic photosensitive drums according to Examples 1 to 17 and Comparative Example 1.

Surface Shape Analysis 1

A surface shape of a square observation region with one side of 100 μm on the outer surface of the electrophotographic photosensitive drum was observed under magnification with a laser microscope (VK-X200, manufactured by Keyence Corporation). Subsequently, a first reference line L1 that passes through the central point of the observation region and is parallel to the circumferential direction of the electrophotographic photosensitive drum was provided on an image including concave and convex shapes of wrinkles obtained by the observation. Further, reference lines L2 to L3,600 obtained by rotating the first reference line L1 at every 0.1° around the central point of the observation region were provided.

Thereafter, the following Condition 1 was verified for each of the reference lines L1 to L3,600, and a case where all the reference lines L1 to L3,600 satisfied Condition 1 was determined as A, and a case where any one of the reference lines L1 to L3,600 did not satisfy Condition 1 was determined as B.

Condition 1: The line intersects with the convex portions of the wrinkles at a plurality of locations and has at least two different intersection angles selected from the plurality of intersecting locations.

The results are shown in Table 2.

Surface Shape Analysis 2

From the observation results in the square observation region with one side of 100 μm obtained in the surface shape analysis 1, height information hi (1=1, . . . , 1,000) of the wrinkles was obtained at an interval of 0.1 μm along the reference line that passes through the center of the observation region and is parallel to the circumferential direction of the electrophotographic photosensitive drum, and then, an average value $h_{ave}$ of the heights of the wrinkles was calculated according to the following Equation (VI).

$$h_{ave} = \frac{1}{1000}\sum_{l=1}^{1000} h_l \qquad \text{(VI)}$$

Next, an average value hm of the heights at five points arbitrarily selected from apexes of the convex portions of the wrinkles (points on ridgelines of the wrinkles) in the observation region was calculated, and a difference Δ from the average value $h_{ave}$ was calculated according to the following Equation (VII).

$$\Delta = hm - h_{ave} \qquad \text{(VII)}$$

The results are shown in Table 2.

Surface Shape Analysis 3

The height information of the wrinkles obtained in the surface shape analysis 2 was subjected to frequency analysis to obtain a two-dimensional power spectrum F(r,θ). Next, a distribution function p(r) obtained by making the two-dimensional power spectrum F(r,θ) one-dimensional in a radial direction was calculated to determine a frequency rp at which p(r) was maximized.

Further, an angular distribution q(θ) of F(rp,θ) was calculated at the frequency rp at which p(r) was maximized, and a case where a variation in power values in the entire θ region was 10% or less was determined as A, and a case where the variation in power values in the entire θ region was greater than 10% was determined as B.

The results are shown in Table 2.

Torque Evaluation

As an electrophotographic apparatus, a modified laser beam printer (trade name: HP LaserJet Enterprise Color M553dn, manufactured by Hewlett-Packard Company) was used. As a modification point, first, an abutting pressure of a cleaning blade against an electrophotographic photosensitive drum was changed to 50% of a product condition. Further, the electrophotographic apparatus was modified to measure the amount of drive current of a rotary motor of the electrophotographic photosensitive drum. In addition, the electrophotographic apparatus was modified to adjust and measure a voltage applied to a charging roller and to adjust and measure the intensity of image exposure light.

Each of the electrophotographic photosensitive drums according to Examples 1 to 17 and Comparative Example 1 was mounted in a cartridge for a cyan color of the electrophotographic apparatus.

Subsequently, an image of a test chart having a printing ratio of 5% was printed out onto 100 sheets of A4 size plain paper. A charging condition was adjusted so that a dark portion potential was −500 V, and an exposure condition was adjusted so that the amount of image exposure light was 0.25

μJ/cm$^2$. Thereafter, a drive current value (current value A) when 100 sheets were output was read. The larger the obtained current value, the larger the frictional force between the electrophotographic photosensitive drum and the cleaning blade.

In addition, an electrophotographic photosensitive drum was produced without performing the second heat treatment in the formation of the protection layer in Example 1, and this electrophotographic photosensitive drum is used as a control electrophotographic photosensitive drum for obtaining a control value for obtaining a relative torque value. A drive current value (current value B) of the rotary motor of the electrophotographic photosensitive drum obtained by the method described above was measured using the produced control electrophotographic photosensitive drum.

A ratio of the drive current value (current value A) of the rotary motor of the electrophotographic photosensitive drum obtained as described above to the drive current value (current value B) of the rotary motor of the electrophotographic photosensitive drum obtained as described above was calculated. The obtained numerical value of (current value A)/(current value B) was a relative torque value. The smaller the relative torque value, the smaller the frictional force between the electrophotographic photosensitive drum and the cleaning blade.

The results are shown in Table 2.

Cleanability Evaluation

Following the torque evaluation, and the evaluation was performed using a half tone image immediately after continuously printing 10 sheets of solid white images and then printing 10 sheets of solid black images. Specifically, streaks in the half tone image caused by slipping of the toner due to a cleaning failure were visually counted, and the evaluation was performed according to the following criteria.

A: No streaks were observed on the image, and the image quality was good.

B: Very slight streaks were observed.

C: Slight streaks were observed.

D: The streaks were observed on a part of the image.

E: The streaks were observed on the entire image.

The results are shown in Table 2.

TABLE 1

| Example | Charge transport layer: Charge transporting substance Type | | Protection layer: Monomer having polymerizable functional group Type | | Protection layer: Thickness (μm) |
|---|---|---|---|---|---|
| Example 1 | (1-1) | (1-3) | (2-1) | (3-1) | 0.3 |
| Example 2 | (1-1) | (1-3) | (2-1) | (3-1) | 0.5 |
| Example 3 | (1-1) | (1-3) | (2-1) | (3-1) | 1.0 |
| Example 4 | (1-1) | (1-3) | (2-1) | (3-1) | 1.5 |
| Example 5 | (1-1) | (1-3) | (2-1) | (3-1) | 3.0 |
| Example 6 | (1-1) | (1-2) | (2-1) | (3-1) | 1.5 |
| Example 7 | (1-1) | (1-4) | (2-1) | (3-1) | 1.5 |
| Example 8 | (1-1) | (1-5) | (2-1) | (3-1) | 1.5 |
| Example 9 | (1-1) | (1-6) | (2-1) | (3-1) | 1.5 |
| Example 10 | (1-4) | (1-6) | (2-1) | (3-1) | 1.5 |
| Example 11 | (1-1) | (1-3) | (2-2) | (3-1) | 1.5 |
| Example 12 | (1-1) | (1-3) | (2-3) | (3-1) | 1.5 |
| Example 13 | (1-1) | (1-3) | (2-4) | (3-1) | 1.5 |
| Example 14 | (1-1) | (1-3) | (2-6) | (3-1) | 1.5 |
| Example 15 | (1-1) | (1-3) | (2-1) | (3-4) | 1.5 |
| Example 16 | (1-1) | (1-3) | (2-1) | (3-5) | 1.5 |
| Example 17 | (1-1) | (1-3) | (2-1) | (3-7) | 1.5 |
| Comparative Example 1 | (1-1) | (1-3) | (2-1) | (3-1) | 1.5 |
| Comparative Example 2 | (1-1) | (1-3) | (2-1) | (3-1) | 1.5 |

TABLE 2

| | Surface shape analysis | | Analysis 3 | | Evaluation of electrophotographic characteristics | |
|---|---|---|---|---|---|---|
| Example | Analysis 1 Condition 1 | Analysis 2 Δ (μm) | rp (μm$^{-1}$) | Variation in power values | Relative torque value | Cleanability |
| Example 1 | A | 0.6 | 0.220 | A | 0.64 | A |
| Example 2 | A | 1.0 | 0.113 | A | 0.63 | A |
| Example 3 | A | 2.0 | 0.056 | A | 0.61 | A |
| Example 4 | A | 2.4 | 0.040 | A | 0.60 | B |
| Example 5 | A | 6.2 | 0.015 | A | 0.58 | B |
| Example 6 | A | 3.2 | 0.030 | A | 0.59 | B |
| Example 7 | A | 3.4 | 0.031 | A | 0.59 | B |
| Example 8 | A | 3.2 | 0.035 | A | 0.60 | B |
| Example 9 | A | 3.1 | 0.033 | A | 0.61 | B |
| Example 10 | A | 2.9 | 0.029 | A | 0.60 | B |
| Example 11 | A | 3.0 | 0.030 | A | 0.59 | B |
| Example 12 | A | 3.3 | 0.030 | A | 0.60 | B |
| Example 13 | A | 3.1 | 0.031 | A | 0.58 | B |
| Example 14 | A | 3.1 | 0.033 | A | 0.59 | B |
| Example 15 | A | 3.2 | 0.034 | A | 0.62 | B |
| Example 16 | A | 2.9 | 0.031 | A | 0.60 | B |
| Example 17 | A | 3.0 | 0.030 | A | 0.60 | B |
| Comparative Example 1 | B | 0.5 | 0.200 | B | 0.62 | D |
| Comparative Example 2 | B | 0.5 | 0.220 | B | 0.63 | D |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-075644, filed Apr. 21, 2020, which is hereby incorporated by reference herein in its entirety.

What is claimed is:

1. An electrophotographic photosensitive member having drum shape, the electrophotographic photosensitive member comprising:

a support; and a photosensitive layer, an outer surface of the electrophotographic photosensitive member having wrinkles, wherein when an observation region having square form with one side of 100 μm is placed at any position on the outer surface, and a line that passes through a central point of the observation region and is parallel to a circumferential direction of the electrophotographic photosensitive member is defined as a first reference line L1, and 3,599 reference lines obtained by rotating the first reference line L1 at every 0.1° around the central point are respectively defined as L2 to L3,600, (i) each of L1 to L3,600 intersects with convex portions of the wrinkles at a plurality of locations and has at least two different intersection angles selected from the plurality of locations, (ii) when a two-dimensional power spectrum F(r,θ) with a frequency component as r and an angle component as θ is obtained by performing frequency analysis of height information of the wrinkles in the observation region, a one-dimensional radial direction distribution function p(r) obtained by integrating the two-dimensional power spectrum F(r,θ) in a θ direction has at least one maximum value, and (iii) when an angular distribution q(θ) is calculated from the two-dimensional power spectrum F(r,θ) at a frequency rp at which the one-dimensional radial direction distribution function p(r) has the maximum value, a variation in power values in the entire θ range is 10% or less.

2. The electrophotographic photosensitive member according to claim 1, wherein the frequency rp is in a range of 0.05 to 1.00 $\mu m^{-1}$.

3. The electrophotographic photosensitive member according to claim 1, wherein a difference between hm and $h_{ave}$ is 0.5 to 2.0 μm when hm is a value obtained by arbitrarily selecting five points of apexes of the convex portions of the wrinkles in the observation region and averaging heights of the apexes of the convex portions of the wrinkles at the selected five points, and $h_{ave}$ is an average value of heights of the wrinkles in the observation region.

4. A process cartridge integrally supporting an electrophotographic photosensitive member having drum shape and at least one member selected from the group consisting of a charging unit, a developing unit and a cleaning unit, and being detachably attachable to a main body of an electrophotographic apparatus, the electrophotographic photosensitive member comprising:

a support; and a photosensitive layer, an outer surface of the electrophotographic photosensitive member having wrinkles, wherein when an observation region having square form with one side of 100 μm is placed at any position on the outer surface, and a line that passes through a central point of the observation region and is parallel to a circumferential direction of the electrophotographic photosensitive member is defined as a first reference line L1, and 3,599 reference lines obtained by rotating the first reference line L1 at every 0.1° around the central point are respectively defined as L2 to L3,600, (i) each of L1 to L3,600 intersects with convex portions of the wrinkles at a plurality of locations and has at least two different intersection angles selected from the plurality of locations, (ii) when a two-dimensional power spectrum F(r,θ) with a frequency component as r and an angle component as θ is obtained by performing frequency analysis of height information of the wrinkles in the observation region, a one-dimensional radial direction distribution function p(r) obtained by integrating the two-dimensional power spectrum F(r,θ) in a θ direction has at least one maximum value, and (iii) when an angular distribution q(θ) is calculated from the two-dimensional power spectrum F(r,θ) at a frequency rp at which the one-dimensional radial direction distribution function p(r) has the maximum value, a variation in power values in the entire θ range is 10% or less.

5. An electrophotographic apparatus, comprising:

an electrophotographic photosensitive member having drum shape, a charging unit, an exposing unit, a developing unit and a transfer unit; and the electrophotographic photosensitive member comprising a support and a photosensitive layer, an outer surface of the electrophotographic photosensitive member having wrinkles, wherein when an observation region having square form with one side of 100 μm is placed at any position on the outer surface, and a line that passes through a central point of the observation region and is parallel to a circumferential direction of the electrophotographic photosensitive member is defined as a first reference line L1, and 3,599 reference lines obtained by rotating the first reference line L1 at every 0.1° around the central point are respectively defined as L2 to L3,600, (i) each of L1 to L3,600 intersects with convex portions of the wrinkles at a plurality of locations and has at least two different intersection angles selected from the plurality of locations, (ii) when a two-dimensional power spectrum F(r,θ) with a frequency component as r and an angle component as θ is obtained by performing frequency analysis of height information of the wrinkles in the observation region, a one-dimensional radial direction distribution function p(r) obtained by integrating the two-dimensional power spectrum F(r,θ) in a θ direction has at least one maximum value, and (iii) when an angular distribution q(θ) is calculated from the two-dimensional power spectrum F(r,θ) at a frequency rp at which the one-dimensional radial direction distribution function p(r) has the maximum value, a variation in power values in the entire θ range is 10% or less.

* * * * *